Aug. 26, 1952     B. M. KOLBER     2,608,178
CIRCULAR POULTRY HOUSE
Filed Sept. 4, 1947     2 SHEETS—SHEET 2
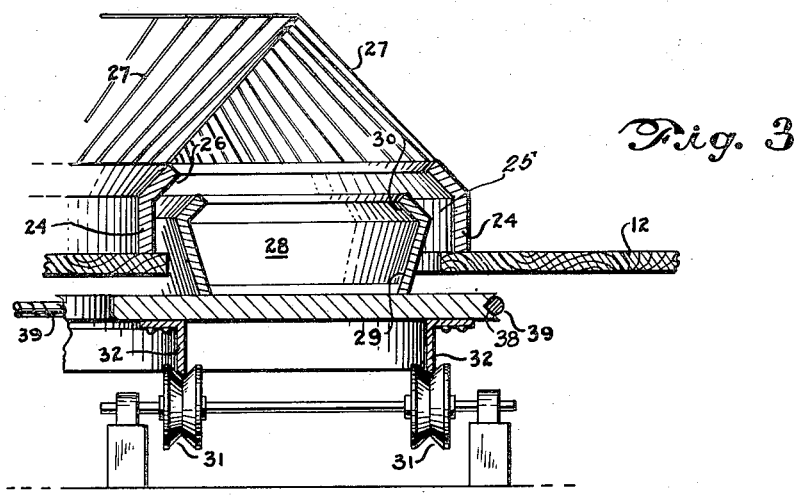
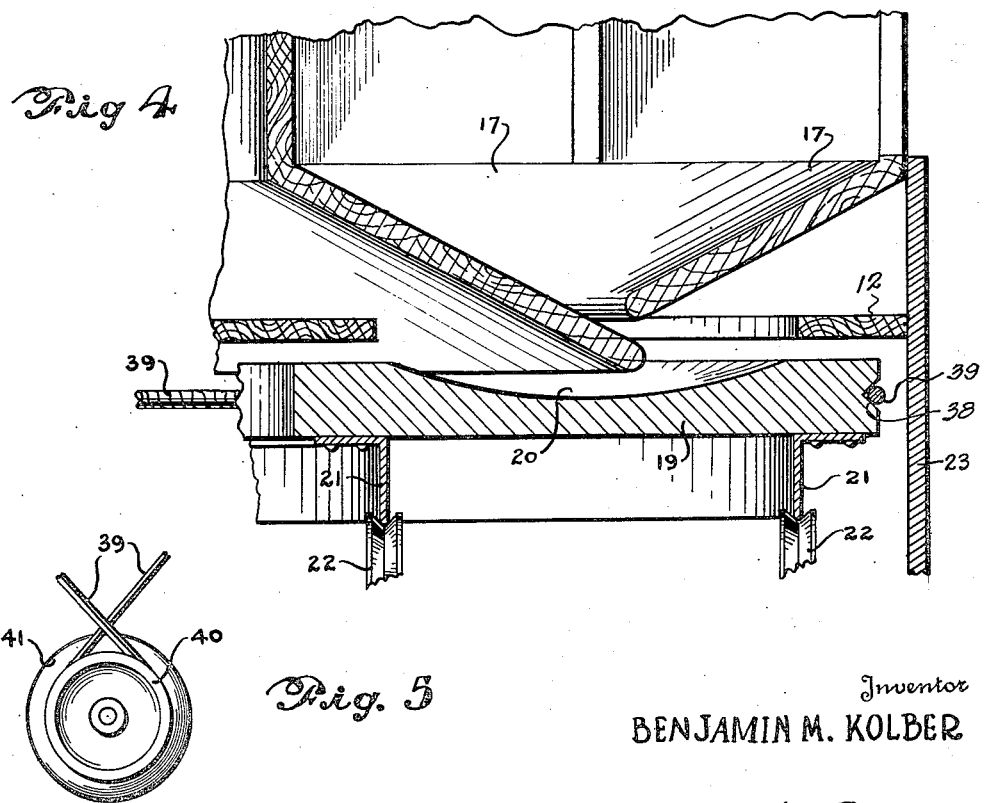
Inventor
BENJAMIN M. KOLBER
By Wilfred E. Lawson
Attorney Patented Aug. 26, 1952

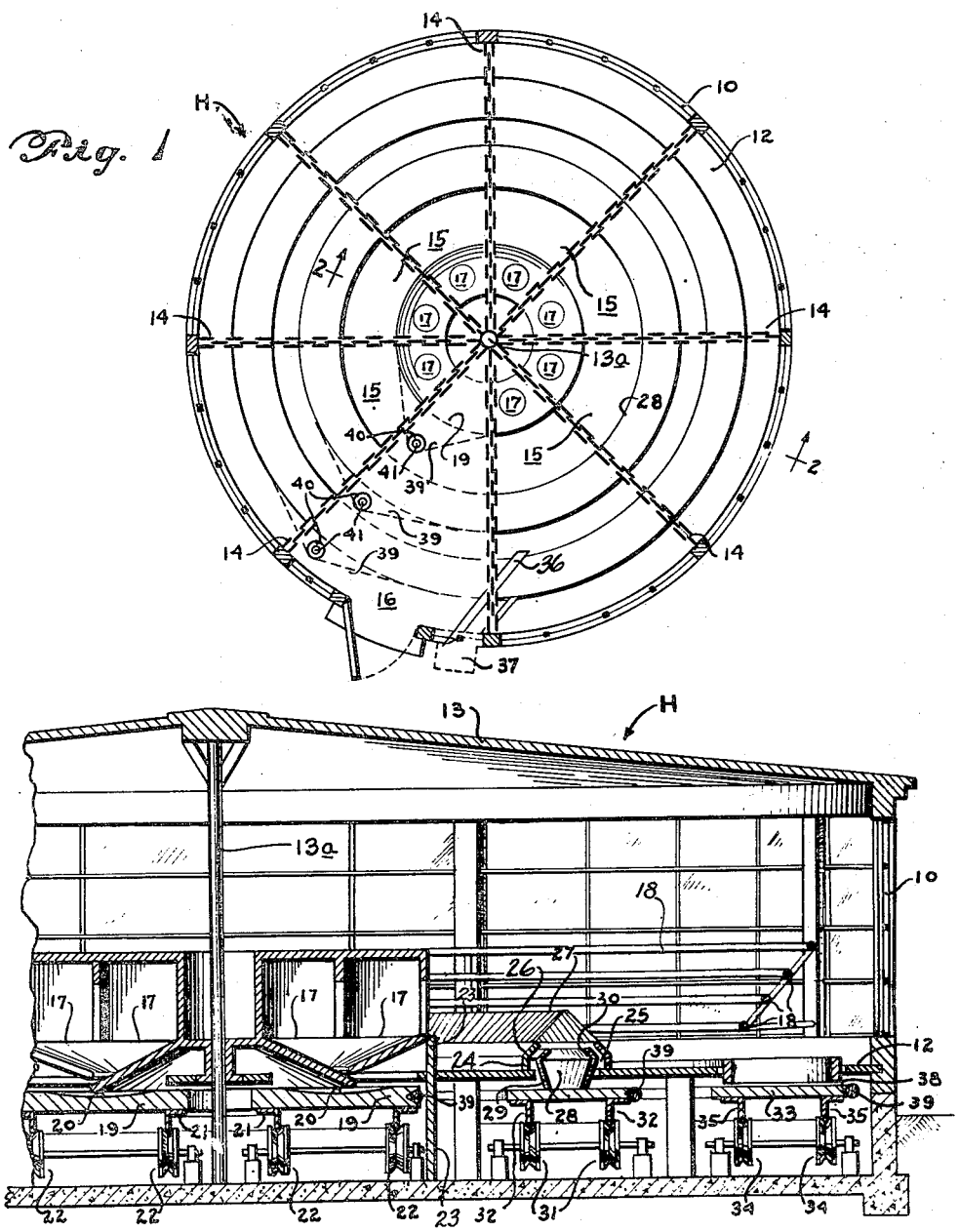

2,608,178

UNITED STATES PATENT OFFICE 2,608,178

CIRCULAR POULTRY HOUSE

Benjamin M. Kolber, Lakewood, N. J.

Application September 4, 1947, Serial No. 772,028

3 Claims. (Cl. 119—21)

This invention relates generally to the class of animal husbandry and pertains particularly to improvements in shelter houses for animals and more specially to means for performing certain operations in connection with the keeping of stock.

While the present invention is applicable to the raising of different kinds of farm stock, it is intended primarily for use in connection with the raising of poultry and a principal object of the present invention is to provide a novel means for carrying out the jobs of collecting eggs from the poultry house, replenishing the feed troughs for the various sections of the house and the removal of manure therefrom, without having to visit each of the various rooms or chambers of the poultry house, whereby it is possible for an attendant to perform these several jobs from one position or location.

Another and more specific object of the invention is to provide a circular structure having a number of rooms or chambers in each of which a prescribed number of stock is housed, with circular, movable units designed to rotate concentrically one with the other and within the circular house, through the several rooms or chambers, to move eggs, feed troughs, and manure through one room or past a prescribed point where the eggs may be removed, the feed troughs refilled and the manure removed.

Other objects and advantages of the invention will become apparent as the description of the same proceeds and the invention will be best understood from a consideration of the following detailed description, taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a diagrammatic illustration of the layout of a poultry house constructed in accordance with the present invention, the view being in the form of a horizontal section with parts of the structure removed.

Figure 2 is an enlarged vertical section taken substantially on the line 2—2 of Figure 1, with the intervening walls and details of the perches omitted for clarity.

Figure 3 is an enlarged detail view of a portion of the feeding trough.

Figure 4 is an enlarged detail view of a portion of the egg collector structure.

Figure 5 is an enlarged detail view of the cable connection between one motor and the adjacent rotary unit.

According to the present system of raising live stock, such as poultry, on a large scale, there are employed a number of small houses, pens or coops built together in a straight row and means is provided for running through the pens or houses lengthwise of the row, a carrier in which feed is transported from one pen to the next and, in connection with the raising of poultry, in which eggs may be collected. This requires that the attendant, each time that the houses are serviced, which, in connection with the feeding of chickens, is three times a day, must traverse the entire length of the structure, going from one house or pen to the next to put out the feed and collect the eggs.

In accordance with the present invention there is provided a house of circular form, generally designated "H" upon the accompanying drawings, and having the outside circular wall 10, the floor 12 and roof 13 having a central support 13a. This structure is divided radially by partitions or walls 14 thus dividing the structure into a number of compartments or rooms 15 for housing the stock and a control and supply compartment or room 16.

In the employment of a structure of this character for the raising of poultry, the nests 17 are located upon the inner side of each room near the center of the structure. The roosts or perches 18 are disposed at the outer side of each room. This arrangement may, of course, be reversed if desired or found convenient.

Disposed concentrically in the circular building is a circular or annular conveyor structure which is generally designated 19 and which passes through each of the rooms and is positioned beneath the nests 17 which are, of course, of the type to permit the eggs to pass down, as laid, onto the top of the conveyor.

The top of the conveyor is formed in the shape of a shallow trough as indicated at 20 so that the eggs as they pass downwardly from the nests, will roll to the center of the conveyor platform and will be prevented from dropping off onto the floor.

The underside of the conveyor platform 19 has secured thereto the spaced concentric tracks 21 which are preferably formed from angle iron material. One flange of such material is secured to the underside of the platform while the other flange extends downwardly and forms the tracks and these tracks rest upon suitably spaced grooved wheels or rollers 22 which are supported for free rotation.

In order to prevent injury to the chickens the conveyor structure 19 is enclosed within the circular vertical walls 23 which extend downwardly from the bottoms of the nests to the floor of the house.

Encircling the egg collecting conveyor 19 are two spaced circular walls 24 which provide a circular corridor 25. The top edge of each wall has the upwardly and inwardly extending flange 26 and extending across between these flanges to cover the upper part of the corridor, are the spaced guard wires 27 which prevent the chickens getting down into the corridor but do not prevent them from extending their heads down into the feed trough 28.

Disposed within the corridor formed by the two walls 24 is the annular feed trough, previously referred to and generally designated 28. This feed trough has the side walls 29 outwardly diverging slightly as shown and the top edge of each side wall has the inturned lip 30 which prevents the chickens from spilling the feed. This lip at each side of the trough lies beneath an inturned flange 26 of the adjacent corridor wall.

Disposed in an annular arrangement beneath the feed trough structure is a number of pairs of flanged wheels or rollers 31 which are peripherally grooved or channeled and which rotatably support the feed trough.

The underside of the feed trough has secured thereto the tracks 32, each of which is in the form of an annulus and which engages in the peripheral grooves of the underlying rollers so that the feed trough is supported for free rotation.

Lying outside of the feed trough structure 28 and spaced therefrom is the circular or annular flat manure or droppings conveyor floor 33 which is positioned beneath the perches or roosts 18.

Beneath the floor 33 are rotatably supported, in a circular series, the pairs of peripherally grooved wheels or rollers 34 and the underside of the floor has secured thereto the two annular tracks 35 which, as shown, are preferably made up of angle iron material like the tracks associated with the feed trough and with the egg collecting conveyor previously described.

It will be readily apparent that since the circular conveyors 19, 28 and 33, are concentrically arranged in the house, each one will pass through the feed room 16 as well as through each of the stock rooms 15, so that when these conveyors are turned the person attending to the house may remain within the feed room and collect the eggs from the conveyor 19 as it is rotated and at the same time may replenish the feed supply in the feed trough 28.

Means is provided for automatically cleaning off the manure or droppings conveyor floor 33, by the provision of an obliquely disposed scraper blade 36 which is supported in a suitable manner to extend across and contact the surface of the floor adjacent to that radial wall 14 which separates the feed room from the adjacent stock room through which the manure floor moves toward the feed room.

By disposing the scraper blade 36 at the proper angle the material upon the floor will be scraped up and caused to move radially outwardly toward a suitable discharge opening such, for example, as that designated 37. This opening may lead through the floor of the house and, if desired, to a suitable chute arranged so that a carrier of desired form may be run into position to receive the material as it is discharged from the floor 33.

While any suitable means may be employed for rotating the annular conveyor units, the mechanism here disclosed is preferred as being simple and reliable in operation.

Each of the three annular or rotatable conveyor units is either formed, or has mounted thereon means, to provide an encircling V-pulley or pulley groove 38 in which is engaged a pulley belt or cable 39 which encircles the rotatable unit.

Within the feed room 16 are mounted three pulleys 40, each disposed adjacent to a rotatable unit and arranged to turn on a vertical axis and the adjacent pulley belt or cable 39 is wrapped or looped around the pulley 40 as illustrated.

Each of the pulleys 40 has operatively coupled therewith a drive motor 41 and suitable means may be provided in the form of a switch, not shown, or the like for controlling the operation of these motors so that the house attendant when in the feed room, may start any one of the motors at will to cause the annular units operatively coupled therewith to be turned.

From the foregoing it will be readily apparent that a live stock house constructed in accordance with the present invention may be easily taken care of by one man with less work than is required in taking care of houses of the type where the units, pens or coops, are constructed to extend in a straight line, because of the fact that the attendant can service all of the rooms or coops without moving out of the one feed room.

I claim:

1. In a poultry house, including a circular building having a floor, a side wall, a conical roof, a vertical support for the center of the roof, and partitions extending radially outward from the support to divide the interior of the building into a plurality of compartments, one of the compartments having an entrance and constituting a control and supply compartment, a nest supported above the floor at the inner end of each of the other of the compartments, each of the nests opening into its respective compartment and downwardly for the discharge of eggs laid therein, a conveyor extending through the compartments beneath the nests for the deposit of the eggs thereon and the delivery of the same within the control compartment, a conveyor extending through the compartments outwardly of the first mentioned conveyor for transporting feed from the control compartment thereto, roosts mounted within the outer ends of the said other compartments, a droppings floor conveyor movable through the compartments outwardly of the second mentioned conveyor to catch droppings from the roosts and transport the same to a point of discharge therefrom outwardly of an opening in the outer wall of the control compartment, and means within the control compartment for imparting independent turning motions to the conveyors.

2. The poultry house as defined in claim 1, with each of the said conveyors in the form of an annular platform mounted on rail guided wheels, the platform of the first mentioned conveyor having an annular trough-like channel in its top surface to receive the eggs as they drop through the bottoms of the nests, the platform of the second mentioned conveyor having an annular trough mounted thereon for the feed placed therein at the control compartment, and a scraper blade is associated with the said opening in the outer wall of the control compartment for removing the droppings from the platform of the said droppings floor conveyor as the latter is being turned.

3. The poultry house as defined in claim 1, with a separate power drive means located within the control compartment and operatively connected with each of the said conveyors to affect the independent turning of the same as required.

BENJAMIN M. KOLBER.

REFERENCES CITED

The following references are of record in the file of this patent:

UNITED STATES PATENTS

| Number | Name | Date |
|---|---|---|
| 1,058,259 | Pratt | Apr. 8, 1913 |
| 1,167,129 | Swedberg | Jan. 4, 1916 |
| 1,385,281 | Smiley | July 19, 1921 |
| 1,438,693 | Bowker | Dec. 12, 1922 |
| 1,854,850 | Linkenauger | Apr. 19, 1932 |
| 1,921,352 | Ferguson | Aug. 8, 1933 |
| 2,096,356 | Fox | Oct. 19, 1937 |
| 2,197,160 | Schuppner | Apr. 16, 1940 |
| 2,314,444 | Cornell | Mar. 23, 1943 |

FOREIGN PATENTS

| Number | Country | Date |
|---|---|---|
| 518,820 | Germany | Feb. 23, 1931 |
| 46,217 | Denmark | Sept. 19, 1932 |